United States Patent
Dorrendorf et al.

(10) Patent No.: US 11,190,340 B2
(45) Date of Patent: Nov. 30, 2021

(54) EFFICIENT UNIFIED HARDWARE IMPLEMENTATION OF MULTIPLE CIPHERS

(71) Applicant: Arm Limited, Cambridge (GB)

(72) Inventors: Leonid Dorrendorf, Givatayim (IL); Ruvein Itskhak Levin, Shoham (IL); Ury Kreimer, Tkoa (IL)

(73) Assignee: ARM LIMITED, Cambridge (GB)

( * ) Notice: Subject to any disclaimer, the term of this patent is extended or adjusted under 35 U.S.C. 154(b) by 340 days.

(21) Appl. No.: 16/428,880

(22) Filed: May 31, 2019

(65) Prior Publication Data

US 2019/0372753 A1 Dec. 5, 2019

(30) Foreign Application Priority Data

Jun. 1, 2018 (GB) .................................... 1809006

(51) Int. Cl.
G06F 21/00 (2013.01)
H04L 9/06 (2006.01)
G06F 7/72 (2006.01)
G09C 1/00 (2006.01)

(52) U.S. Cl.
CPC ............ *H04L 9/0631* (2013.01); *G06F 7/724* (2013.01); *G09C 1/00* (2013.01)

(58) Field of Classification Search
None
See application file for complete search history.

(56) References Cited

U.S. PATENT DOCUMENTS

| | | | |
|---|---|---|---|
| 9,906,360 B2* | 2/2018 | Johnson | H04L 9/0631 |
| 2005/0283714 A1* | 12/2005 | Korkishko | G06F 7/726 |
| | | | 714/781 |
| 2010/0208885 A1* | 8/2010 | Murphy | H04L 9/003 |
| | | | 380/28 |
| 2015/0278555 A1* | 10/2015 | Melzani | G06F 21/72 |
| | | | 713/192 |

FOREIGN PATENT DOCUMENTS

WO 2004/014016 A1 2/2004

OTHER PUBLICATIONS

Tran, Bao Ngoc et al. A New S-Box Structure Based on Graph Isomorphism. 2009 International Conference on Computational Intelligence and Security. https://ieeexplore.ieee.org/stamp/stamp.jsp?tp=&arnumber=5376472 (Year: 2009).*

(Continued)

*Primary Examiner* — Jeremiah L Avery
(74) *Attorney, Agent, or Firm* — Talem IP Law, LLP

(57) ABSTRACT

A method for creating unified, efficient hardware implementations for multiple symmetric ciphers is described. For a chosen set of two or more distinct types of symmetric ciphers, a unified substitution box (SBOX) is designed that can implement most of the operations in a single hardware block, with small hardware blocks added before and after the unified SBOX for unique operations of each distinct symmetric cipher. Optimization techniques can also be applied to the linear operations and SBOX operations for the chosen set, rather than individually for each symmetric cipher, of the two or more distinct types of symmetric ciphers.

20 Claims, 4 Drawing Sheets

(56) References Cited

OTHER PUBLICATIONS

Liang, Hao et al. Design of a Masked S-Box for SM4 Based on Composite Field. 2014 Tenth International Conference on Computational Intelligence and Security. https://ieeexplore.ieee.org/stamp/stamp.jsp?tp=&arnumber=7016923 (Year: 2014).*
D.Canright, "A Very Compact S-Box for AES", Cryptographic Hardware and Embedded Systems—CHES 2005, 2005, 15 pages, https://www.iacr.org/archive/ches2005/032.pdf.
Christoforus Juan Benvenuto, "Galois Field in Cryptography", May 31, 2012, 11 pages.
Bonseok Koo et al., "Design and Implementation of Unified Hardware for 128-Bit Block Ciphers ARIA and AES", ETRI Journal, Dec. 2007, 3 pages, vol. 29, No. 6.
"Specification for the Advanced Encryption Standard (AES)", Federal Information Processing Standards Publication 197, Nov. 26, 2001, 51 pages.
Rei Ueno et al., "Highly Efficient $GF(2^8)$ Inversion Circuit Based on Redundant GF Arithmetic and Its Application to AES Design", Sep. 2015, 18 pages.
Whitfield Diffie et al., "SMS4 Encryption Algorithm for Wireless Networks", Issued Jan. 2006, translated May 15, 2008, 6 pages.
Akashi Satoh et al., "Unified Hardware Architecture for 128-Bit Block Ciphers AES and Camellia", Lecture Notes in Computer Science, Sep. 2003, 23 pages.
Imran Abbasi et al., "A Compact S-Box Design for SMS4 Block Cipher", Nov. 1, 2011, 16 pages.
Combined Search and Examination Report issued in GB Application No. 1809006.8, dated Jan. 2, 2019, 5 pages.

\* cited by examiner

EFFICIENT UNIFIED HARDWARE IMPLEMENTATION OF MULTIPLE CIPHERS

BACKGROUND

The present disclosure relates to the efficient unified hardware implementation of multiple ciphers.

Cipher algorithms (also referred to as "ciphers") are used to encrypt and decrypt data. The ciphers can be implemented in hardware, software, or a combination of hardware and software. Modern ciphers leverage the power of current computing capabilities to perform calculations on very large numbers (that are used as the cryptographic key) to maintain the integrity, secrecy, and authenticity of a message. The messages may be in the form of individual bits or blocks of bits. Ciphers can use either symmetric keys (where the same key is used to encrypt and decrypt a message) or asymmetric keys (where different keys are used for the encryption and decryption). Ciphers using symmetric keys (also referred to as "symmetric ciphers") include DES (Data Encryption Standard), AES (Advanced Encryption Standard), SM4 (formerly SMS4—the Chinese National Standard for Wireless LAN WAPI), and ARIA (the standard selected by the Korean Agency for Technology and Standards). Ciphers using asymmetric keys (also referred to as "asymmetric ciphers") include RSA (Rivest, Shamir, and Adleman) and ECC (Elliptic Curve Cryptography).

Most modern symmetric ciphers are typically designed as a series of rounds, each round consisting of a series of linear operations, followed by a SBOX (substitution box) transformation, possibly followed by additional linear operations. The linear operations (such as addition, shifts, rotations and mixes) are usually applied to the entire input block (typically 128 bits), to diffuse input data. The SBOX applies a reversible, non-linear transformation to its input, and is typically applied to every 8-bit block of the input.

BRIEF SUMMARY

Efficient, unified hardware implementations of multiple ciphers are described herein. A system incorporating security features can be implemented with at least two distinct types of ciphers sharing a unified hardware. For example, a single hardware block implementing operations (e.g., SBOX operations) of two or more distinct types of symmetric ciphers can be generated as described herein. The single hardware block may implement most of the operations of the two or more distinct types of symmetric ciphers while individual hardware blocks can be provided before and, optionally, after the single hardware block for the unique operations of each of the two or more distinct types of symmetric ciphers.

For a case where the at least two distinct types of ciphers are symmetric cyphers that include one or more SBOX transformation processes, the single hardware block can be a unified SBOX hardware. The unified SBOX hardware may include shared circuitry and, in some cases, circuitry unique to each type of cipher.

A method is provided that unifies SBOX hardware across a chosen set of two or more distinct types of symmetric ciphers; and optimizes the unified SBOX hardware over the combined set. The method can include receiving two or more distinct types of symmetric ciphers to be unified; for each cipher of the two or more distinct types of symmetric ciphers, separating cipher operations for that cipher into linear operations and SBOX operations; grouping components corresponding to the linear operations of the two or more distinct types of symmetric ciphers into a group of linear operation components and grouping components corresponding to the SBOX operations of the two or more distinct types of symmetric ciphers into a group of SBOX operation components. For the group of SBOX operation components, the method includes separating the SBOX operations into multiplicative inverse components and affine transformation components.

The method determines a set of optimal Galois Fields and bases in which to implement the multiplicative inverse components for the group of SBOX operation components, selects a first set of hardware functional blocks to map inputs to the multiplicative inverse components from a corresponding original Galois Field into the optimal Galois Fields, and selects a second set of hardware functional blocks to map outputs from the multiplicative inverse components back into the corresponding original Galois Field. The first set of hardware functional blocks can correspond to isomorphisms for transforming the inputs to the multiplicative inverse components into the optimal Galois Fields; and the second set of hardware functional blocks can correspond to reverse isomorphisms for transforming the outputs from the multiplicative inverse components back into the corresponding original Galois Field.

An affine transformation optimization process can be performed on the affine transformation components of the group of SBOX operation components to generate optimized affine transformation components. The resulting unified hardware of a unified SBOX hardware can be output for use in manufacturing a processor implementing multiple ciphers. The unified SBOX hardware includes the first set of hardware functional blocks, the second set of hardware functional blocks, and the optimized affine transformation components.

In some cases, the method can further include performing a linear operations optimization process for the group of linear operations components, and outputting optimized linear operations components.

Accordingly, a unified hardware of at least two distinct types of symmetric ciphers can include a unified SBOX hardware comprising: a first set of hardware functional blocks corresponding to isomorphisms for transforming inputs to a group of multiplicative inverse components from a corresponding original Galois Field into an optimal Galois Field, wherein the group of multiplicative inverse components comprise a combined group of multiplicative inverse components of all of the at least two distinct types of symmetric ciphers; a second set of hardware functional blocks corresponding to reverse isomorphisms for transforming outputs from the group of multiplicative inverse components back into the corresponding original Galois Field; and an optimized group of affine transformation components, wherein the group of affine transformation components comprise a combined group of affine transformation components of all of the at least two distinct types of symmetric ciphers; and optimized linear operations components, wherein the optimized linear operations components comprise linear operations components for all of the at least two distinct types of symmetric ciphers.

A system is also described that includes at least two distinct types of ciphers sharing a unified SBOX hardware, wherein the unified SBOX hardware comprises: a first set of hardware functional blocks corresponding to isomorphisms for transforming inputs to a group of multiplicative inverse components from a corresponding original Galois Field into an optimal Galois Field, wherein the group of multiplicative inverse components comprise a combined group of multiplicative inverse components of all of the at least two distinct types of ciphers; a second set of hardware functional blocks corresponding to reverse isomorphisms for transforming outputs from the group of multiplicative inverse components back into the corresponding original Galois Field; and an optimized group of affine transformation components, wherein the group of affine transformation components comprise a combined group of affine transformation components of all of the at least two distinct types of ciphers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present technique will be described further, by way of example only, with reference to embodiments thereof as illustrated in the accompanying drawings, in which.

DETAILED DESCRIPTION

Figure 1:
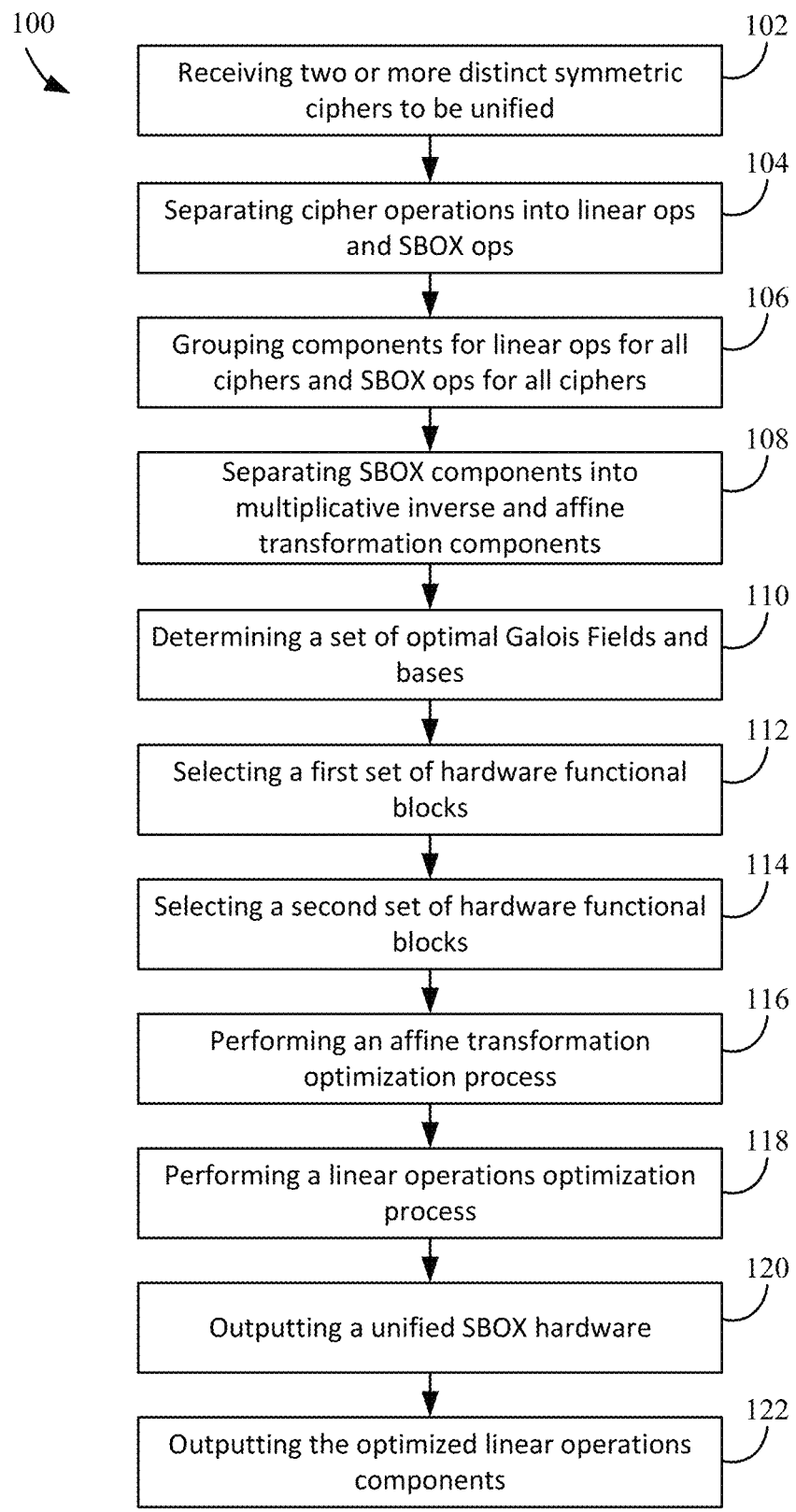
FIG. 1 shows a process flow diagram of an example method of creating a unified, efficient hardware implementation for multiple distinct types of ciphers.

Efficient, unified hardware implementations of multiple ciphers are described herein. Hardware implementations of ciphers may include functional hardware blocks with one or more types of logic gates, such as, but not limited to, AND gates and NOR gates.

In general, as key size (for example, bit length of the cryptographic key) increases, so does the computation power needed to crack the cipher and reveal the message. Therefore, there is a security benefit to using larger size keys. In addition, multiple distinct types of symmetric ciphers can be used on the same message to provide additional security, which also provides a security benefit. However, the benefits of increasing key size and using multiple distinct types of symmetric ciphers are constrained by the limitations of area overhead, power consumption, and speed of cipher operations. In cases where multiple distinct types of ciphers are used, for example, in network security, the number of logic gates required to perform the cipher operations can be very large, on the order of several thousand gates. As the gate count increases, the area overhead and power consumption may increase, and the speed of the cipher operations may decrease. Instead of implementing each type of distinct cipher with its own hardware implementation, the described techniques enable a unified hardware implementation in which certain components (and therefore gates) are shared by at least two ciphers, reducing area overhead (and in some cases power consumption).

A unified approach to implementing multiple distinct types of symmetric ciphers is described herein that can combine logic gates for two or more distinct types of symmetric ciphers to reduce the number of gates, thereby decreasing area overhead and power consumption while increasing speed. For a number of ciphers, the SBOX usually constitutes the only non-linear component in a cipher, and is the most expensive with respect to hardware gate count. The method described herein may unify most, and in some cases, all, of the SBOX hardware across a chosen set of multiple symmetric ciphers. In some cases, further optimization can be applied to reduce gate count. For example, optimization techniques can be applied to the linear operations of the symmetric ciphers. In the described methods, the target of optimization, and the cost function used in the optimization, is not the hardware for a single symmetric cipher, but rather for the chosen set of multiple distinct symmetric ciphers. This approach can benefit from a common pattern of gates used across multiple modern symmetric ciphers, where the SBOX is designed as a combination of a multiplicative inverse operation in a Galois Field and an affine transformation. Such modern symmetric ciphers may include, but are not limited to, AES, SM4 (previously SMS4), and ARIA. However, it should be understood that the approach and method described herein can be applicable to any other symmetric cipher using SBOX operations based on the combination of a multiplicative inverse and a linear or affine transformation.

FIG. 1 shows a process flow diagram of an example method of creating a unified, efficient hardware implementation for multiple distinct types of ciphers. Process 100 can be a computer-implemented method performed on a computing system such as system 500 described with respect to FIG. 5. Process 100 may be a stand-alone tool or incorporated in an electronic design automation software tool or other software application. The process 100 can begin with receiving two or more distinct types of symmetric ciphers (102). The ciphers may be received in response to a selection from available ciphers by a user and/or by some other indication of cipher circuitry and/or algorithm that is selected by a user for generating a unified hardware implementation. For each distinct type of symmetric cipher, the cipher operations are separated, for that symmetric cipher, into linear operations and SBOX operations (104). The components corresponding to linear operations of the two or more distinct types of symmetric ciphers are then grouped into a group of linear operation components and the components corresponding to the SBOX operations of the two or more distinct types of symmetric ciphers are grouped into a group of SBOX operation components (106). For the group of SBOX operation components, the SBOX operations are separated into multiplicative inverse components and affine transformation components (108).

The process 100 includes determining a set of optimal Galois Fields and bases in which to implement the multiplicative inverse components for the group of SBOX operation components (110). In some cases, the optimal Galois Fields and bases are determined by an exhaustive "brute force" search (e.g., using a suitable brute force algorithm). Galois Fields of $2^8$ elements are all isomorphic and there are as many fields as there are irreducible polynomials of degree 8, which is about several dozen, allowing for an exhaustive search. It may also be possible to map the input to different bases and later mapping the output back into the standard base. Each of the Galois Fields can be represented in a normal basis or a polynomial basis. Normal bases simplify multiplication operations and polynomial bases simplify addition operations. There are several bases of each type to choose from, enabling exhaustive search by choosing different fields and bases for each operation.

Figure 3:
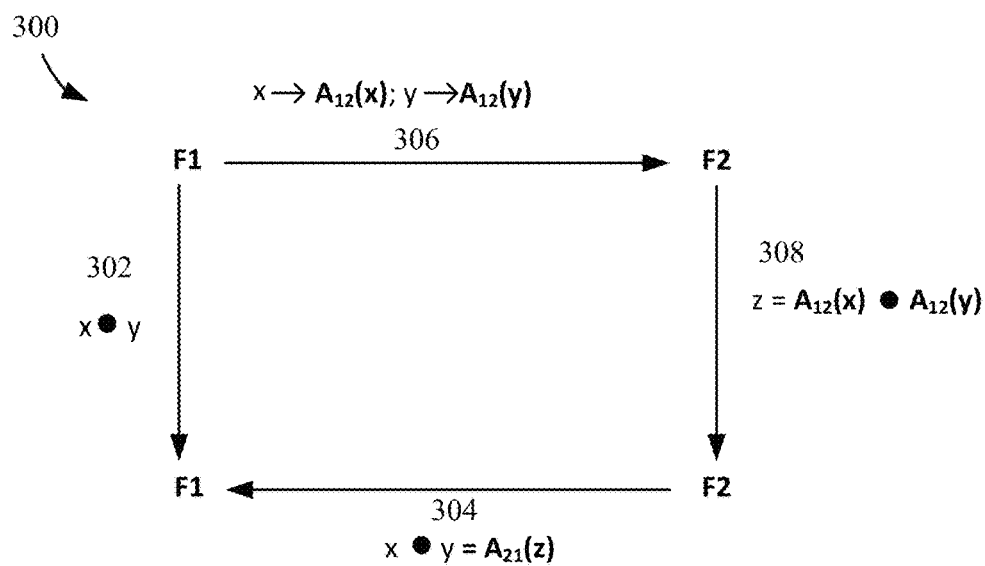
FIG. 3 shows a graphical representation of isomorphism between Galois Fields preserving the multiplication and addition operations in the fields.

As discussed in more detail with respect to FIG. 3, a first set of hardware functional blocks can be selected to map inputs to the multiplicative inverse components from a corresponding original Galois Field into the optimal Galois Fields (112) and a second set of hardware functional blocks can be selected to map outputs from the multiplicative inverse components back into the corresponding original Galois Field (114). The first set of hardware functional blocks can correspond to isomorphisms for transforming the inputs to the multiplicative inverse components into the optimal Galois Fields and the second set of hardware functional blocks can correspond to reverse isomorphisms for transforming the outputs from the multiplicative inverse components back into the corresponding original Galois Field.

The first set of hardware functional blocks and the second set of hardware functional blocks selected by the system can be standard blocks (also referred to as standard cells) found in a directory or a technology library of common blocks available, for example for syntheses (e.g., in an electronic design automation software tool). In a further implementation, additional optimization can be carried out on the hardware functional blocks (as well as any other circuitry identified by the process). This optimizing can be carried out by, for each cell library available for synthesis, choosing the library and set of gates which produces the best results for optimizing area and/or number of gates (e.g., using fewer gates). For example, better results can be achieved, in some cases, with NAND and NOR gates rather than with AND and OR gates (and sometimes with NAND or AND gates instead of NOR or OR gates or vice versa). This general optimization technique can be employed during hardware synthesis.

For the affine transformation components of the group of SBOX operation components, an affine transformation optimization process can be performed to generate optimized affine transformation components for all ciphers (116). The affine transformation optimization process can include a shared factors technique. Similarly, a linear operations optimization process can be performed on the group of linear operations components of all ciphers (118). The linear operations optimization process can include a shared factors technique. The system can output a unified SBOX hardware that can include the first set of hardware functional blocks, the second set of hardware functional blocks, and the optimized affine transformation components (120). The system can also output the optimized linear operations components (122).

Figure 2:
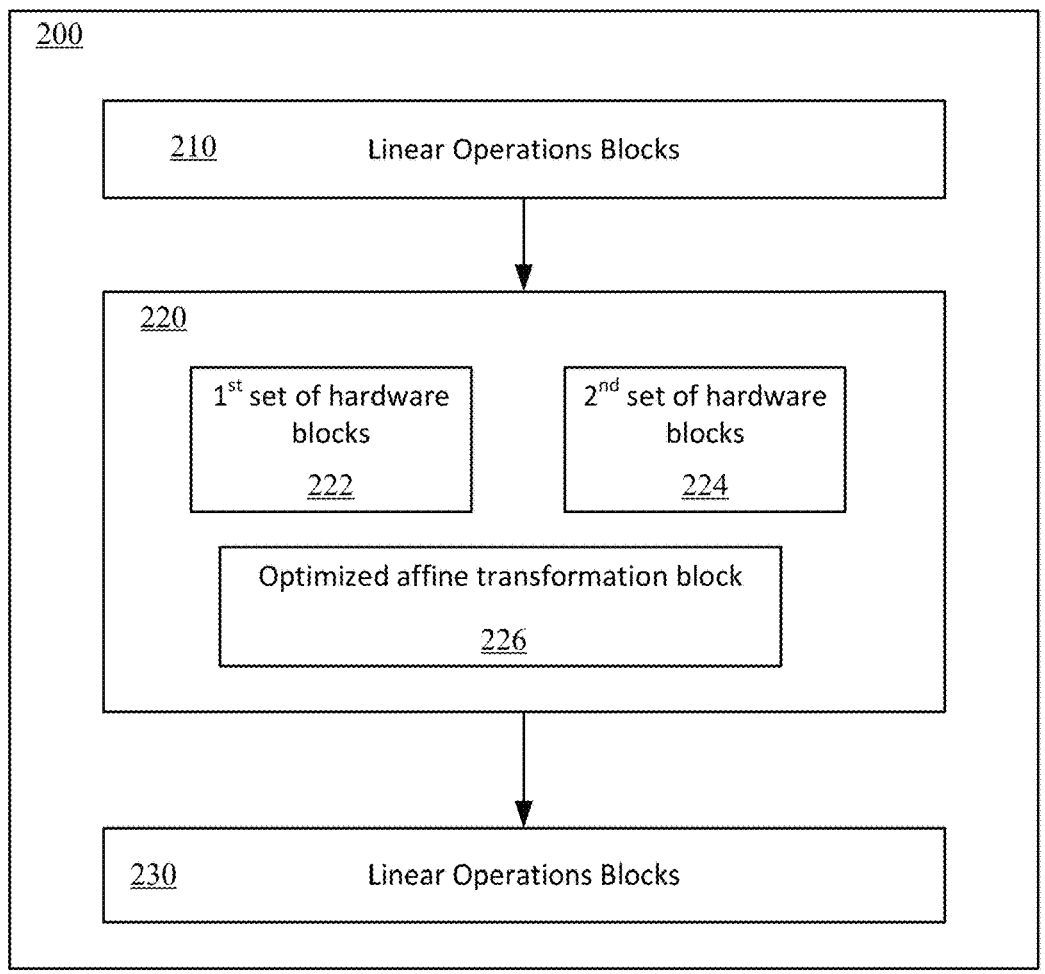
FIG. 2 shows an example of a hardware block diagram of an optimized chip.

Once designed, for example, via processes including process 100, the system can be implemented, for example, on an individual chip or as discrete components embedded within a printed circuit board (PCB). FIG. 2 shows an example of a hardware block diagram of an optimized chip. A unified hardware 200 of at least two distinct types of symmetric ciphers can include linear operations blocks 210; a unified SBOX block 220, which can include a first set of hardware functional blocks 222, a second set of hardware functional blocks 224, and an optimized affine transformation components block 226. Additional linear operations blocks 230 can be provided at an output of the SBOX block 220.

The first set of hardware functional blocks 222 can correspond to isomorphisms for transforming inputs to a group of multiplicative inverse components from a corresponding original Galois Field into an optimal Galois Field, wherein the group of multiplicative inverse components comprise a combined group of multiplicative inverse components of all of the at least two distinct types of symmetric ciphers. The second set of hardware functional blocks 224 can correspond to reverse isomorphisms for transforming outputs from the group of multiplicative inverse components back into the corresponding original Galois Field. The optimized group of affine transformation components block 226 comprise a combined group of affine transformation components of all of the at least two distinct types of symmetric ciphers. The linear operations blocks 210 and 230 can be optimized using, for example, shared factors techniques.

In the unified hardware 200, there can be shared components and components unique to the particular ciphers.

FIG. 3 shows a graphical representation of isomorphism between Galois Fields preserving the multiplication and addition operations in the fields. Isomorphism between Galois Fields preserves the addition and multiplication operations in the field. In this example graphical representation 300, $F_1$ and $F_2$ represent two Galois Fields of the same size. There thus exists an isomorphism (represented by matrix $A_{12}$) that provides a one-to-one mapping taking members of $F_1$ to $F_2$ and the inverse isomorphism (represented by matrix $A_{21}=A_{12}^{-1}$, which takes the members of $F_2$ to $F_1$. The calculation of x·y in Galois Field $F_1$ (302), where the ● operation represents addition or multiplication operations, can give the same result as calculating $A_{21}$ $(A_{12}(x) \cdot A_{12}(y))$ (304). In detail, x and y are first taken to Galois Field $F_2$ by isomorphism $A_{12}(x)$ and $A_{12}(y)$, respectively (306). The isomorphism A Once in the Galois Field $F_2$, the multiplication operation can be performed to obtain result z (308). The result z is then taken back to Galois Field $F_1$ by applying the reverse isomorphism, $A_{21}$, (304).

This relationship is leveraged by the described operations 110, 112, and 114 where isomorphisms and inverse isomorphisms are identified such that calculations can be carried out in Galois Fields (e.g., $F_2$) that are optimized over the combined ciphers before returning the results to the original Galois Field (e.g., $F_1$) for each corresponding cipher (and the subsequent operations).

As an illustrative example, let C1 and C2 represent two distinct types of ciphers. The SBOX (S1) in the first cipher C1 can be defined as some function in the Galois Field $F_1$ (for example, multiplication, additions, and scalar multiplications in $F_1$) and the SBOX (S2) of the second cipher C2 can be defined as a function in the Galois Field $F_2$. Rather than having two different logics for each S1 and S2, a unified ("optimal") Galois Field, F_unified, can be found (e.g., via operation 110 described with respect to FIG. 1). All SBOX operations can thus be performed for both S1 and S2 in the optimal Galois Field F_unified.

The use of the optimal Galois Field F_unified is possible because of the relationship illustrated in FIG. 3. As a further example, $x_1$ can be an element in $F_1$ (one byte of the cipher state that is an input to SBOX S1). Typically, $S1(x_1)$ is calculated in $F_1$. However, a unified SBOX hardware can be used instead. To do this, $x_1$ can be transferred to F_unified. The image of $x_1$ in F_unified (based on isomorphism $A_{1,unified}$, which maps members of $F_1$ to F_unified) can be denoted by $A_{1,unified}(x_1)$. Calculations can be performed in F_unified until a complete image, F_unified_image(z) of the $S1(x)$, is created. Because the isomorphism, $A_{1,unified}$, preserves the addition and multiplication operations, the result z in F_unified can be taken back to the corresponding original Galois Field $F_1$ using the inverse isomorphism Aunified,$_1$. This means that $S(x_1)=A_{unified,1}(z)$. The same process can be performed for the second cipher, S2. Namely, element $x_2$ in $F_2$ can be transferred to the same optimal Galois Field F_unified by isomorphism $A_{2,unified}(x_2)$. All the calculations can be performed in F_unified, and then a reverse transformation $A_{unified,2}(z)$ can be performed to get the result $S2(x_2)$ in the field $F_2$.

Thus, in this example, rather than having two completely separate hardware blocks for the two SBOXs, there can be a shared hardware for the SBOX with four additional transformation blocks providing simple linear transforms $A_{1,unified}$, $A_{2,unified}$, and the reverse transformations $A_{unified,1}$ and $A_{unified,2}$. The four additional transformations can be implemented with a much smaller footprint than an implementation of the additional SBOX.

Referring back to FIG. 1, the hardware selected in operation (112) can implement $A_{1,unified}$ and $A_{2,unified}$ and the hardware selected in operation (114) can implement $A_{unified,1}$ and $A_{unified,2}$. F_unified can be chosen such that the number of gates for the SBOX calculation in F_unified+the number of gates for implementing $A_{1,unified}$+the number of gates for implementing $A_{2,unified}$+the number of gates for implementing $A_{unified,1}$+the number of gates for implementing $A_{unified,2}$ will be minimal over all possible values.

The unified hardware implementation of multiple ciphers described herein can be optimized using the techniques previously discussed: mapping the SBOX inputs into a different Galois Field then choosing one of the bases for this field iteratively, performing the shared factors technique for the group of linear operations components and the group of affine transformation components, and by choosing standard blocks from different technology libraries to provide the least number of gates. For each of these techniques, all options can be examined, either exhaustively or by using search algorithms, and the result with the lowest gate count can be chosen.

Figure 4:
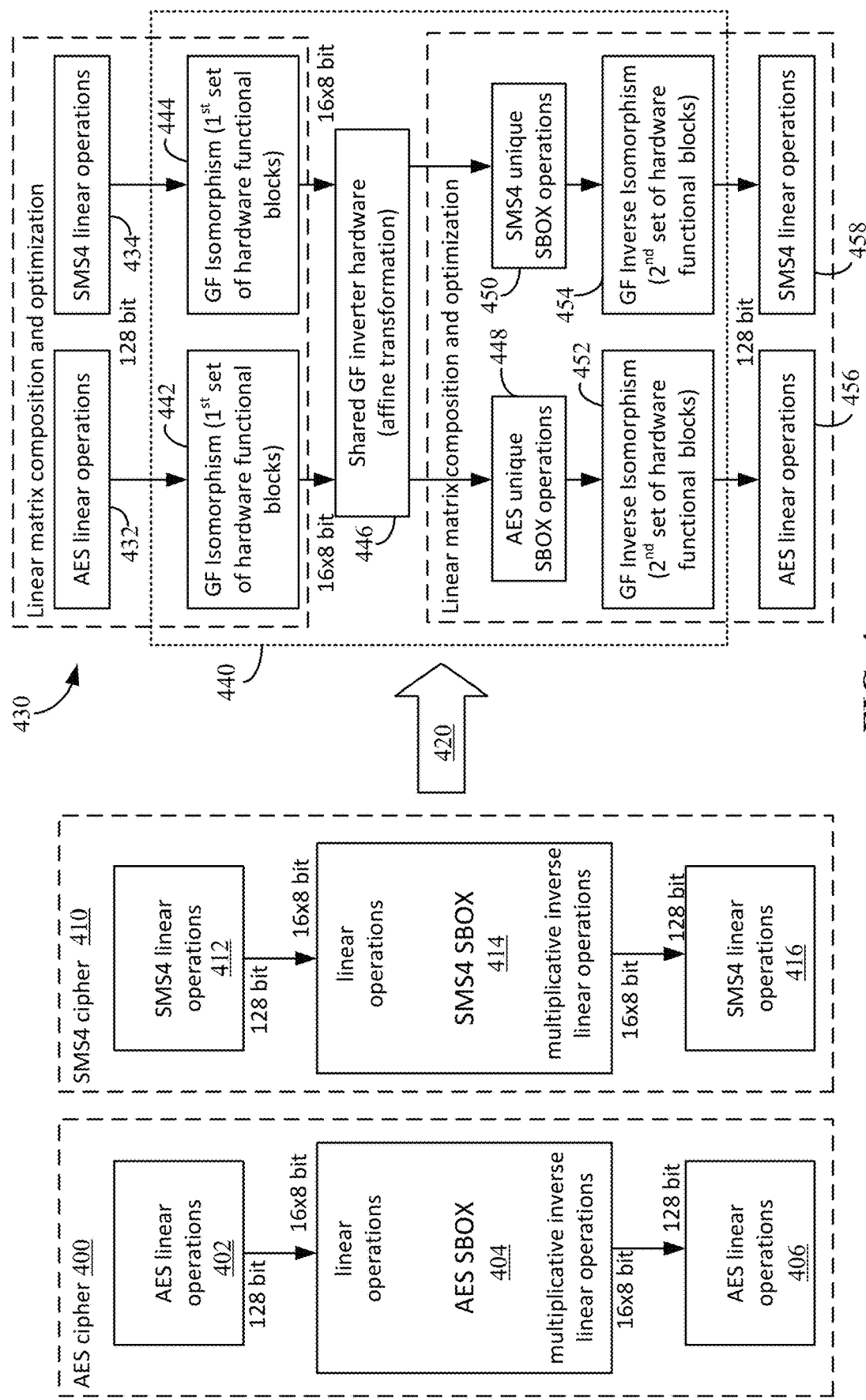
FIG. 4 illustrates an example unified hardware implementation of AES and SMS4.

FIG. 4 illustrates an example unified hardware implementation of AES and SMS4. In this example, two distinct types of symmetric ciphers, AES and SMS4, are used. However, it should be understood that more than two ciphers, as well as different types of symmetric ciphers, can be used.

Usually, in many block-ciphers, such as explained by D. Canright in "A Very Compact S-box for AES", SBOX function of an input byte (8-bit vector) α is defined by two items. 1. Inverse: Let $c=\alpha^{-1}$, the multiplicative inverse in $GF(2^8)$ (except if α=0 then c=0), where the multiplication is defined modulo an irreducible polynomial. 2. Affine Transformation: Then the output is $s=Mc \oplus b$, with the constant bit matrix M and byte b.

For example, for AES (e.g., AES cipher 400 of FIG. 4), the affine transformation is defined as follows:

$$\begin{pmatrix} s_7 \\ s_6 \\ s_5 \\ s_4 \\ s_3 \\ s_2 \\ s_1 \\ s_0 \end{pmatrix} = \begin{pmatrix} 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \\ 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \end{pmatrix} \begin{pmatrix} c_7 \\ c_6 \\ c_5 \\ c_4 \\ c_3 \\ c_2 \\ c_1 \\ c_0 \end{pmatrix} + \begin{pmatrix} 0 \\ 1 \\ 1 \\ 0 \\ 0 \\ 0 \\ 1 \\ 1 \end{pmatrix},$$

where $M = \begin{pmatrix} 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \\ 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \end{pmatrix}$, and $b = \begin{pmatrix} 0 \\ 1 \\ 1 \\ 0 \\ 0 \\ 0 \\ 1 \\ 1 \end{pmatrix}$.

As can be seen from the above, the affine transformation can be represented as an 8-bit×8-bit matrix applied to the input byte as an 8-bit vector. This transformation can be optimized by finding shared factors (e.g., operation 116 of FIG. 1). For example, finding small component computations that are repeated more than once when computing the matrix multiplication. For example, a repeated addition operation over two multiplied factors may be identified, then computed once, and the result used multiple times.

The AES algorithm uses the Galois field of 8-bit bytes where the bits are coefficients of a polynomial (this representation is referred to as a polynomial basis) and multiplication is modulo the irreducible polynomial $q(x)=x^8+x^4+x^3+x+1$.

For the inverse calculation, a general element G of $GF(2^8)$ is represented as a linear polynomial (in y) over $GF(2^4)$, as $G(y)=\gamma_1(y)+\gamma_0$ with multiplication modulo an irreducible polynomial $r(y)=y_2+\tau y+v$. All the coefficients are in the 4-bit subfield $GF(2^4)$. Accordingly, the pair represents G in terms of a polynomial basis [Y, 1], where Y is one root of r(y). As an alternative to the polynomial bases, the normal basis $[Y^{16}, Y]$ can be used, using both roots or r(y). Note that $r(y)=y^2+\tau y+v=(y+Y)(y+Y^{16})$.

It is also possible to similarly represent $GF(2^4)$ as linear polynomials (in z) over $GF(2^2)$, as $\gamma=\Gamma_1 z+\Gamma_0$, with multiplication modulo an irreducible polynomial $s(z)=z^2+Tz+N$, with all the coefficients in $GF(2^2)$. Again, this uses a polynomial basis [Z, 1], where Z is one root of s(z). Of course, as an alternative, the normal basis $[Z^4, Z]$ could be used.

Next, $GF(2^2)$ can be represented as linear polynomials (in w) over GF(2), as $\Gamma=g_1 w+g_0$, with multiplication modulo $t(w)=w2+w+1$, where $g_1$ and $g_0$ are single bits. This uses a polynomial basis [W, 1], with W one root of t(w); or a normal basis would be $[W^2, W]$.

Accordingly, operations in $GF(2^8)$ can be expressed in terms of simpler operations in $GF(2^4)$, which in turn are expressed in the simple operations of $GF(2^2)$. In each of these fields, addition (the same operation as subtraction) is just bitwise XOR, for any basis.

In $GF(2^\hat{}_8)$ with a polynomial basis, multiplication mod $y^2+\tau y+v$ is given by $$(\gamma_1 y+\gamma_0)(\delta_1 y+\delta_0)=(\gamma_1\delta_0+\gamma_0\delta_1+\gamma_1\delta_1\tau)y+(\gamma_0\delta_0+\gamma_1\delta_1 v).$$

From this relationship, it is easy to verify that the inverse is given by $$(\gamma_1 y+\gamma_0)^{-1}=[\theta^{-1}\gamma_1]y+[\theta^{-1}(\gamma_0+\gamma_1\tau)],$$

where $\theta=\gamma_1^2 v+\gamma_1\gamma_0\tau+\gamma_0^2$.

Therefore, finding an inverse in $GF(2^8)$ reduces to an inverse and several multiplications in $GF(2^4)$. Analogous formulas for multiplication and inversion apply in $GF(2^4)$.

Simpler versions apply in $GF(2^2)$, where the inverse is the same as the square (for $\Gamma \in GF(2^2)$, $\Gamma^4 = \Gamma$); note then that a zero input gives a zero output, so that special case is handled automatically.

The details of these calculations change if a normal basis is used at each level. In $GF(2^8)$, recall that both $Y$ and $Y^{16}$ satisfy $y^2 + \tau y + v = 0$, where $\tau = Y^{16} + Y$ and $v = (Y^{16})Y$, so $1 = \tau^{-1}(Y^{16} + Y)$. Then, multiplication becomes:

$$(\gamma_1 Y^{16} + \gamma_0 Y)(\delta_1 Y^{16} + \delta_0 Y) = [\gamma_1 \delta_1 \tau + \theta] Y^{16} + [\gamma_0 \delta_0 \tau + \theta] Y,$$

where $\theta = (\gamma_1 + \gamma_0)(\delta_1 + \delta_0) v \tau^{-1}$, and the inverse is:

$$(\gamma_1 Y_{16} + \gamma_0 Y)^{-1} = [\theta^{-1} \gamma_0] Y^{16} + [\theta^{-1} \gamma_1] Y,$$

where $\theta = \gamma_1 \gamma_0 \tau^2 + (\gamma_1^2 + \gamma_0^2) v$.

Again, finding an inverse in $GF(2^8)$ involves an inverse and several multiplications in $GF(2^4)$, and analogous formulas apply in the subfields.

The above shows that both polynomial bases and normal bases give comparable amounts of operations, at this level; both types remain roughly comparable at lower levels of optimization. (Of course, one could choose other types of basis at each level, but both polynomial and normal bases have structure that leads to efficient calculation, which is lacking in other bases.)

All of the subfield polynomial and normal bases that had a trace of unity were considered. There are eight choices for the norm $v$ that make $r(y) = y2 + y + v$ irreducible over $GF(2^4)$, and two choices for N that make the polynomial $s(z) = z^2 + z + N$ irreducible over $GF(2^2)$. Each of these polynomials $r(y)$, $s(z)$, and $t(w)$ has two distinct roots. For a polynomial basis, either root may be used; or for a normal basis both roots are used. So altogether there are $(8 \times 3) \times (2 \times 3) \times (1 \times 3) = 432$ possible cases (including the all-polynomial case).

After comparing all of the 432 cases, including all low-level optimizations appropriate to each case, for the example embodiment, the most compact was judged to be the one giving the least number of gates.

Since the different Galois fields correspond to different choices of an irreducible polynomial and are all isomorphic, an SBOX optimization can be applied across multiple ciphers. When optimizing the total gate count for multiple ciphers, all possible Galois fields are analyzed to build the logic for the inverse function in the field using the technique described above. For each field, the number of gates is calculated.

For the set of chosen ciphers, $C_1, C_2, \ldots C_n$ denote $Is_{1,i}$, $Is_{2,i}, \ldots, Is_{n,i}$ set of isomorphisms to the field i. So $Is_{j,i}$: $GF(2^8)_j \rightarrow GF(2^8)_i$. Then, combining with affine transformation, the calculation of SBOX in $GF(2^8)_i$ for the cipher j will look as follows: $s = Is_{i,j}(M \, Is_{j,i}(a)^{-1}) \oplus b$. In addition, $Is_{i,j}M$ can be combined to save one bit matrix multiplication. The inverse SBOX function is similar, except the XOR with constant b comes first.

For each such constant-matrix multiply, the gate count can be reduced by "factoring out" combinations of input bits that are shared between different output bits (rows). One way to do this is known as the "greedy algorithm," where at each stage one picks the combination of two input bits that is shared by the most output bits; that combination is then pre-computed in a single (XOR) gate, which output effectively becomes a new input to the remaining matrix multiply.

Next, the sum of gates needed to implement $Is_{i,j}M$, $Is_{j,i}$ is calculated as $$\min_i \sum_j^{\#ciphers} \#gates(Is_{i,j}M) + \#gates(Is_{j,i}) + \#gates(\text{field inverse logic}),$$

which is for the Galois inverse logic in the field j for given i and for all j, and which gives the Galois field $GF(2^8)_i$ in which the unified cipher SBOX will operate. The unified logic contains inverse function in $GF(2^8)_i$, $MIs_{j,i}$, $Is_{i,j}$, for all j (which goes through the Galois fields corresponded to SBOX definitions for the given ciphers).

For example, referring to FIG. 4, for AES 400, there is a polynomial $q_{AES}(x) = x^8 + x^4 + x^3 + x + 1$ for SBOX 404 and for SM4 410 there is another polynomial $q_{SM4}(x) = x^8 + x^7 + x^6 + x^5 + x^4 + x^2 + 1$ for SBOX 414. In addition, the SBOX for ARIA (not shown) is defined as an inverse transformation in the same Galois field as for SBOX 404 of AES but with different affine transformation. Each isomorphism, and, more generally, each change of basis, means multiplication by an 8×8 bit matrix.

When separately implemented, an AES cipher 400 and SMS4 cipher 410, have a gate count covering their corresponding initial linear operations 402, 412; SBOX operations 404, 414, and subsequent linear operations 406, 416. Through application of the described techniques (420), the total gate count for the unified SBOX 440 can be, for example, about 50% smaller than the sum of the separate SBOXs.

For example, the unified hardware 430 of the AES and SMS4 cipher can include initial linear operations 432, 434; the unified SBOX 440, which can include a Galois Field Isomorphism for the AES cipher 442, a Galois Field Isomorphism for the SMS4 cipher 444, shared inverter hardware (shared Galois Field inverter hardware) 446 (which includes affine transformation components before or after the inverter, depending on encryption or decryption implementation), AES unique SBOX operations 448, SMS4 unique SBOX operations 450, a Galois Field Inverse Isomorphism for the AES cipher 452, and a Galois Field Inverse Isomorphism for the SMS4 cipher 454; and subsequent linear operations 456, 458.

Each set of linear operations—that may occur in the unified SBOX 440 and as linear operations 432, 434, 456, 458 (such that there may be shared circuitry between the ciphers)—can be represented as a single matrix applied to an input vector using matrix multiplication. The matrix multiplication can be broken down into an explicit series of equations composed of scalar multiplications and additions. As mentioned with respect to operation 118 of FIG. 1, the equations can be searched for "shared factors", which are repeated sub-combinations of small component computations that can be computed once and memorized for reuse. For example, a repeated addition operation over two multiplied factors may be identified, then computed once, and the result used multiple times. For linear operations, each linear operation is represented as a matrix multiplication applied to a vector, in this case an 8-byte block, resulting in a 128-bit×128-bit matrix. When optimizing for multiple ciphers, shared factors can be found across a wider set of input equations, which can result in a higher overall optimization.

It can be noted that the ARIA cipher uses two SBOXs, S1 and S2, where S1 is the same as the AES forward SBOX and S2 is defined by the function $h(x) = x^{247}$ over the same Galois Field as in AES. Alternatively, the function can be represented as $h(x) = x^{-8}$, which in a binary field can be written as $h(x) = Cx^{-1}$ for a constant matrix C and implemented using a multiplicative inverse. The multiplication by the matrix C would be implemented by a hardware block unique to the ARIA cipher.

The SBOX operations can be optimized by mapping SBOX inputs to a different Galois Field and then choosing one of the bases for this field iteratively. The target SBOX operation can be represented as a composition of a modular inverse and affine transformation. The modular inverse in an 8 element Galois Field (GF(8)) can be further represented as a combination of addition, multiplication, and modular inverse operations in a smaller 4 element Galois Field (GF(4)). The GF(4) can also be represented as a composition of the same operations in a 2 element Galois Field (GF(2)), the GF(2) operations being trivial to implement in hardware. Each of the Galois Fields can be represented, as previously discussed, in a normal or a polynomial basis, in which normal bases simplify the multiplication operations and polynomial bases simplify the addition operations. There are several bases of each type to choose from, enabling optimization by exhaustive search on the choice field and basis for each operation. This optimization process is performed across the group of SBOXs instead of simply to optimize a single cipher's SBOX.

Figure 5:
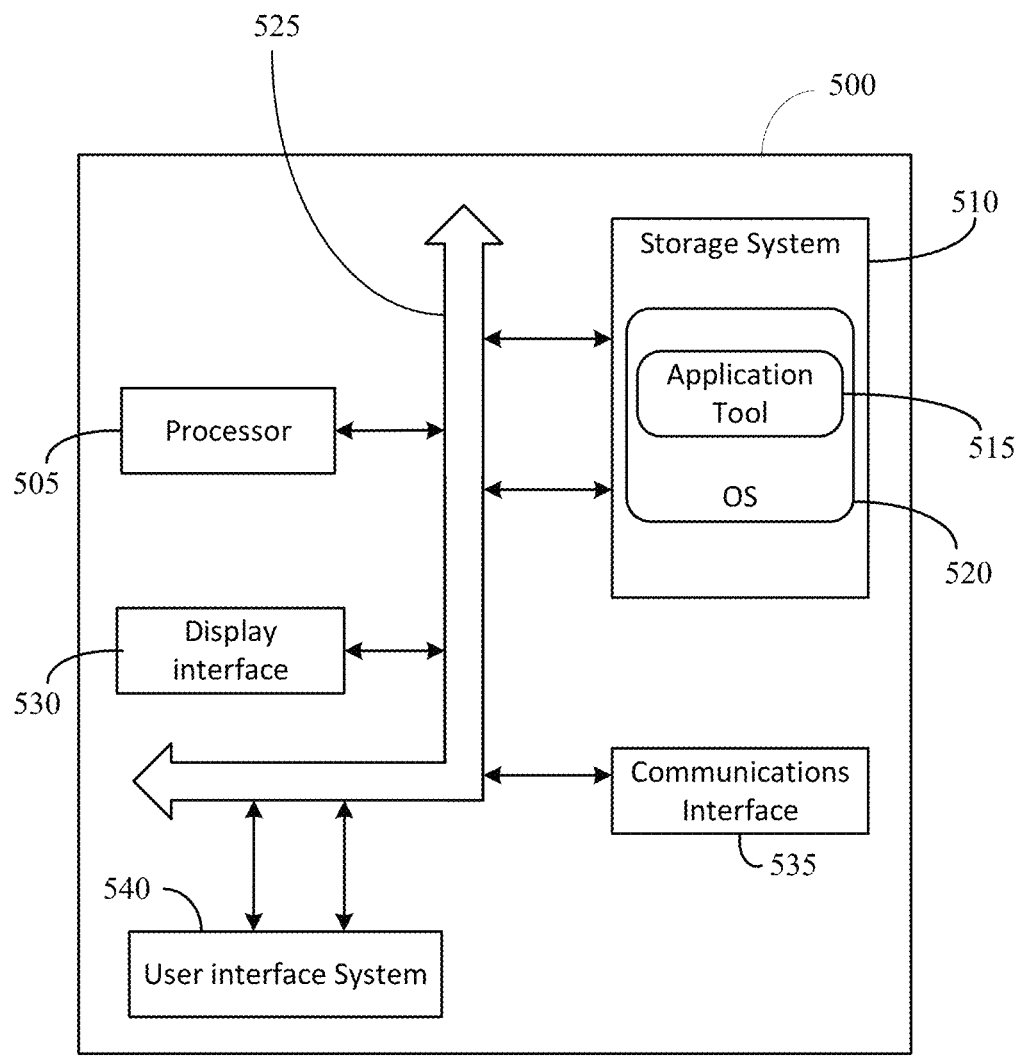
FIG. 5 is a block diagram illustrating components of a computing device used in some embodiments.

FIG. 5 is a block diagram illustrating components of a computing device used in some embodiments. For example, system 500 can be used in implementing a computing device executing the described techniques for creating unified hardware implementations for multiple ciphers, which may be a stand-alone tool or incorporated in an electronic design automation software tool or other software application. It should be understood that aspects of the system described herein are applicable to both mobile and traditional desktop computers. In addition, certain aspects described with respect to system 500 are applicable to server(s) on which a software tool may be carried out in the case of networked computing stations or web-based tools.

For example, system 500 includes one or more processors, such as processor 505, and a storage system 510 providing one or more computer-readable storage media, which can be configured as a main memory and secondary memory. Storage system 510 may include volatile and nonvolatile memory, removable and non-removable media implemented in any method or technology for storage of information, such as computer readable instructions, data structures, program modules, or other data. Examples of storage media of storage system 510 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal. Storage system 510 may be implemented as a single storage device but may also be implemented across multiple storage devices or sub-systems co-located or distributed relative to each other. Storage system 510 may include additional elements, such as a controller, capable of communicating with processing system 505.

Each processor 505 processes data according to instructions of one or more application programs, including application tool 515 (which can perform the methods described herein), and/or operating system (OS) 520 that can be stored on storage system 510. Examples of processors, such as processor 505, include general purpose central processing units, application specific processors, and logic devices, as well as any other type of processing device, combinations, or variations thereof. The processor 505 may be on, or is included in, a system-on-chip (SoC) along with one or more other components such as network connectivity components, sensors, video display components.

Each processor 505 and the storage system 510 is connected to a communication infrastructure 525 (e.g., a communications bus, cross-bar, or network).

System 500 can include a display interface 530 that that forwards graphics, text, and other data from the communication infrastructure 525 (or from a frame buffer not shown) for display.

System 500 may also include a communications interface 535 that enables software and data to be transferred between computer system 500 and external devices. Examples of communications interface 535 can include a modem, a network interface (such as Ethernet card), a communications port, antennas, power amplifiers, RF circuitry, and other communication circuitry. Software and data transferred via communications interface 535 are in the form of signals, which can be electronic, electromagnetic, optical or other signals capable of being received by communications interface 535, via a communications path. Transmissions to and from the communication interface 535 are conducted under control of the operating system 520, which disseminates communications received by the communication interface 535 to application programs, including application tool 515, and vice versa. The communication interface 535 allows system 500 to communicate with other computing devices, including server computing devices and other client devices, over a network.

The system can further include user interface system 540, which may include input/output (I/O) devices and components that enable communication between a user and the system 500. In some cases, the display interface 530 can be considered part of the user interface system 540. User interface system 540 can include or interface to input devices such as a mouse, track pad, keyboard, a touch device for receiving a touch gesture from a user, a motion input device for detecting non-touch gestures and other motions by a user, a camera, a microphone for detecting speech, and other types of input devices and their associated processing elements capable of receiving user input. The user interface system 540 may also include interfaces for speakers, haptic devices for tactile feedback, and other types of output devices.

In various implementations, data/information stored via the system 500 may include data caches stored locally on the device or the data may be stored on any number of storage media that may be accessed by the device via the communication interface 535 or via a wired connection between the device and a separate computing device associated with the device, for example, a server computer in a distributed computing network, such as the Internet. As should be appreciated such data/information may be accessed through the device via the communication interface 535 or a distributed computing network. Similarly, such data/information may be readily transferred between computing devices for storage and use according to well-known data/information transfer and storage means, including electronic mail and collaborative data/information sharing systems.

The methods of creating unified hardware implementations for multiple ciphers may be implemented as a computer process, a computing system, or as an article of manufacture, such as a computer program product or computer-readable storage medium. The software code and data described herein can be stored, for example as modules, on one or more computer readable media, which may include any device or medium that can store code and/or data for use by a computer system. As used herein, computer readable storage media/medium should not be construed to consist of transitory propagating signals. Certain embodiments of the invention contemplate the use of a machine in the form of a computer system within which a set of instructions, when executed, can cause the system to perform any one or more of the methodologies discussed above, including providing a software tool or a set of software tools that can be used during the physical design of integrated circuits and/or printed circuit boards and/or system level design. The set of instructions for the software tool can be stored on a computer program product, which may be one or more computer readable storage media readable by a computer system and encoding a computer program including the set of instructions and other data associated with the software tool.

By way of example, and not limitation, computer-readable storage media may include volatile and non-volatile memory, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of transitory propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts that would be recognized by one skilled in the art are intended to be within the scope of the claims.

What is claimed is:

1. A computer-implemented method comprising:
receiving two or more distinct types of symmetric ciphers to be unified;
for each cipher of the two or more distinct types of symmetric ciphers, separating cipher operations for that cipher into linear operations and SBOX operations;
grouping components corresponding to the linear operations of the two or more distinct types of symmetric ciphers into a group of linear operations components and grouping components corresponding to the SBOX operations of the two or more distinct types of symmetric ciphers into a group of SBOX operation components;
for the group of SBOX operation components, separating the SBOX operations into multiplicative inverse components and affine transformation components;
determining a set of optimal Galois Fields and bases in which to implement the multiplicative inverse components for the group of SBOX operation components;
selecting a first set of hardware functional blocks to map inputs to the multiplicative inverse components from a corresponding original Galois Field into the optimal Galois Fields, the first set of hardware functional blocks corresponding to isomorphisms for transforming the inputs to the multiplicative inverse components into the optimal Galois Fields;
selecting a second set of hardware functional blocks to map outputs from the multiplicative inverse components back into the corresponding original Galois Field, the second set of hardware functional blocks corresponding to reverse isomorphisms for transforming the outputs from the multiplicative inverse components back into the corresponding original Galois Field;
performing an affine transformation optimization process on the affine transformation components of the group of SBOX operation components to generate optimized affine transformation components;
performing a linear operations optimization process on the group of linear operations components;
outputting a unified SBOX hardware comprising the first set of hardware functional blocks, the second set of hardware functional blocks, and the optimized affine transformation components; and
outputting the optimized linear operations components.

2. The method of claim 1, wherein determining the set of optimal Galois Fields and bases in which to implement the multiplicative inverse components for the group of SBOX operation components comprises performing a brute force algorithm.

3. The method of claim 1, wherein one of the two or more distinct types of symmetric ciphers is AES.

4. The method of claim 1, wherein one of the two or more distinct types of symmetric ciphers is SM4.

5. The method of claim 1, wherein one of the two or more distinct types of symmetric ciphers is ARIA.

6. The method of claim 1, wherein performing the affine transformation optimization process comprises using a shared factors technique.

7. The method of claim 1, wherein performing the linear operations optimization process comprises using a shared factors technique.

8. The method of claim 1, wherein the selecting of the first set of hardware functional blocks comprises optimizing for a least number of gates to implement logic of the first set of hardware functional blocks; and the selecting of the second set of hardware functional blocks comprises optimizing for a least number of gates to implement logic of the second set of hardware functional blocks.

9. A unified hardware of at least two distinct types of symmetric ciphers comprising:
a unified SBOX hardware comprising:
a first set of hardware functional blocks corresponding to isomorphisms for transforming inputs to a group of multiplicative inverse components from a corresponding original Galois Field into an optimal Galois Field, wherein the group of multiplicative inverse components comprise a combined group of multiplicative inverse components of all of the at least two distinct types of symmetric ciphers;
a second set of hardware functional blocks corresponding to reverse isomorphisms for transforming outputs from the group of multiplicative inverse components back into the corresponding original Galois Field; and
an optimized group of affine transformation components, wherein the optimized group of affine transformation components comprise a combined group of affine transformation components of all of the at least two distinct types of symmetric ciphers; and
optimized linear operations components, wherein the optimized linear operations components comprise linear operations components for all of the at least two distinct types of symmetric ciphers.

10. The unified hardware of claim 9, wherein the optimized group of affine transformation components is generated by applying a shared factors technique to the combined group of affine transformation components.

11. The unified hardware of claim 9, wherein the optimized linear operations components are generated by applying a shared factors technique to the linear operations components.

12. The unified hardware of claim 9, wherein one of the at least two distinct types of symmetric ciphers is AES.

13. The unified hardware of claim 9, wherein one of the at least two distinct types of symmetric ciphers is SM4.

14. The unified hardware of claim 9, wherein one of the at least two distinct types of symmetric ciphers is ARIA.

15. A system comprising:
at least two distinct types of ciphers sharing a unified SBOX hardware, wherein the unified SBOX hardware comprises:
a first set of hardware functional blocks corresponding to isomorphisms for transforming inputs to a group of multiplicative inverse components from a corresponding original Galois Field into an optimal Galois Field, wherein the group of multiplicative inverse components comprise a combined group of multiplicative inverse components of all of the at least two distinct types of ciphers;
a second set of hardware functional blocks corresponding to reverse isomorphisms for transforming outputs from the group of multiplicative inverse components back into the corresponding original Galois Field; and
an optimized group of affine transformation components, wherein the optimized group of affine transformation components comprise a combined group of affine transformation components of all of the at least two distinct types of ciphers.

16. The system of claim 15, wherein the unified SBOX hardware further comprises a shared Galois Field inverter hardware.

17. The system of claim 15, wherein each of the at least two distinct types of ciphers is symmetric.

18. The system of claim 15, wherein one of the at least two distinct types of ciphers is AES.

19. The system of claim 15, wherein one of the at least two distinct types of ciphers is SM4.

20. The system of claim 15, wherein one of the at least two distinct types of ciphers is ARIA.

* * * * *